United States Patent [19]
Supancic, Jr.

[11] 3,918,474
[45] Nov. 11, 1975

[54] CAPACITOR FILL TUBE AND SEAL
[75] Inventor: John A. Supancic, Jr., Proctor, Vt.
[73] Assignee: General Electric Company, Hudson Falls, N.Y.
[22] Filed: Apr. 15, 1974
[21] Appl. No.: 460,790

Related U.S. Application Data
[63] Continuation of Ser. No. 282,984, Aug. 23, 1972, abandoned.

[52] U.S. Cl. ............. 141/98; 141/349; 251/339
[51] Int. Cl.² ........................................ B65B 39/00
[58] Field of Search ............ 141/11, 67, 84, 98, 129, 141/144, 147, 151, 247, 258, 259, 291–296, 301, 311, 324, 344, 345, 348–350, 360, 363, 383–386, 387, 389, 392; 124/1.5; 220/45, 284, 361; 251/214–216, 144, 339; 317/242

[56] References Cited
UNITED STATES PATENTS
| | | | |
|---|---|---|---|
| 3,258,666 | 6/1966 | Dubilier | 317/242 |
| 3,425,466 | 2/1969 | Grop | 141/349 X |

FOREIGN PATENTS OR APPLICATIONS
| | | | |
|---|---|---|---|
| 1,368,185 | 6/1964 | France | 141/348 |

*Primary Examiner*—Richard E. Aegerter
*Assistant Examiner*—Frederick R. Schmidt

[57] ABSTRACT

A capacitor fill tube and seal combination is disclosed which comprises a fill tube and a plug seal device. The plug seal device comprises a short sleeve member having fill holes in the wall thereof and a threaded sealing plug or plug seat therein covering said fill holes. The sleeve is permanently mounted in a wall of a casing to project into the casing. A threaded fill tube is then threaded into the sleeve and initially engages the plug seal to move the plug further into the sleeve and away from the fill holes while at the same time sealing itself to the casing. After filling of the casing through the sleeve and fill holes, the fill tube is threaded out of the sleeve thus moving the plug seal over the fill holes and against a seal in the sleeve before the fill tube itself is unsealed from the casing.

7 Claims, 4 Drawing Figures

CAPACITOR FILL TUBE AND SEAL

This is a continuation, of application Ser. No. 282,984, filed Aug. 23, 1972 and now abandoned.

BACKGROUND OF THE INVENTION

In filling certain containers or casings with a liquid whereby the casing must maintain the liquid under pressure after filling, there must be some means of sealing the container at the termination of the filling procedure and while the casing is under pressure. One simple means of accomplishing this purpose would be to fill the casing through a tube projection of the casing, and at the termination of the filling to merely pinch off the tubing. These pinch-off devices are quite common in the art particularly in vacuum containers or chambers generally. Other devices are associated with hoses and couplings and are sometimes referred to as "quick disconnect devices" whereby a disengagement of the fill hose or fill tube from a casing activates a sealing mechanism usually in both the casing and the fill tube for sealing purposes.

A large liquid impregnated electrical capacitor comprises a casing which may have a volume of one or more cubic feet and contains a number of capacitor roll sections submerged in an impregnant liquid. Ordinarily, the impregnant liquid in the sealed capacitor may be under a pressure of as much as 10 to 15 pounds per square inch. In order to fill the capacitor casing with the liquid impregnant, it has become the common practice to fill each casing individually and to fill the casing through a metal fill tube arrangement which at the termination of the filling process is pinched off and sealed by welding. The final capacitor, therefore, shows an appendage or short tube section projecting from the casing. Such a projection is undesirable for a number of reasons including the fact that it is exposed to mishandling or other injurious conditions which could cause leakage of the impregnant from the capacitor. At the same time, if the capacitor needs to be repaired in such a manner as to require opening of the capacitor, the seal must be broken and the filling process again performed through the fill tube. In many instances, the pinching and sealing or welding arrangement for the fill tube may not be readily available.

Accordingly it is a principal object of this invention to provide an improved capacitor self-sealing and removable fill tube combination which is adapted for re-use.

SUMMARY OF THE INVENTION

This invention overcomes the foregoing problems by providing within a wall or cover of the capacitor casing a seal device in the form of a short threaded sleeve member or cylinder having lateral apertures or transverse fill holes therein. This sleeve member extends into the casing so that the fill holes are within the casing and the upper end of the sleeve is flush with the external surface of the casing. Within the threaded sleeve member, there is provided a threaded plug seal which can be caused to move past the lateral apertures or fill holes in the sleeve member and thus expose the internal volume of the casing externally through the sleeve member. The uppermost part of the sleeve member includes an internal flange with a sealing material ring thereon so that when the threaded plug is backed off for removal it passes along and closes the lateral fill holes in the sleeve and abutts against the seal at the upper end thereof to seal the casing with a flush mount.

In order to fill the capacitor casing, a fill tube is employed which threads into the sleeve member, engages the plug seal and moves the plug seal away from the lateral fill holes in the sleeve member. At the same time, the fill tube seals itself to the capacitor casing. Accordingly, at the termination of the filling process, the fill tube is rotated for removal from the casing. Since the fill tube is in engagement with the plug seal, the plug seal is rotated to close off the fill holes in the sleeve and to seal itself tightly against the sleeve member prior to the breaking of the seal between the fill tube and the casing. Thereafter, the fill tube is removed physically from the casing and the capacitor filling procedure is completed.

BRIEF DESCRIPTION OF THE DRAWINGS

This invention will be better understood when taken in connection with the following description and the drawings in which.

DESCRIPTION OF THE PREFERRED EMBODIMENTS

Figure 1:
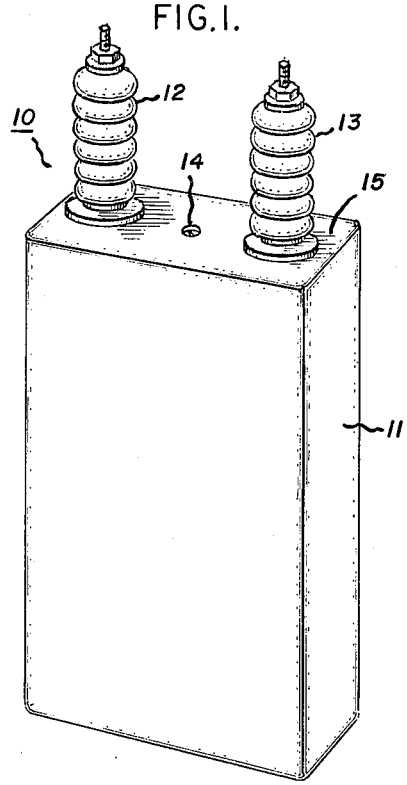
FIG. 1 is an illustration of a typical capacitor to which this invention is applied.

Referring now to FIG. 1, there is shown a power capacitor 10 which is representative of the larger kinds of electrical capacitors. Capacitor 10 comprises a casing 11 which may embrace a volume of one or more cubic feet. Presently, most casings 11 are made of steel and are sealed by welding. At the top of the casing are one or more insulated structures 12 and 13 through which pass electrical connecting leads to the capacitor rolls within the casing. Filling of the casing takes place through means of a fill opening 14 in the cover 15 of the capacitor assembly. Sealing of the fill hole 14 is accomplished by various prior art methods of sealing capacitor fill openings and include, for example, the pinch off tube method as above described. The pinch off tube method is eliminated by the capacitor fill tube and seal device of the present invention which is utilized in connection with fill hole 14 as illustrated. This seal device of the present invention is more clearly illustrated in FIG. 2.

Figure 2:
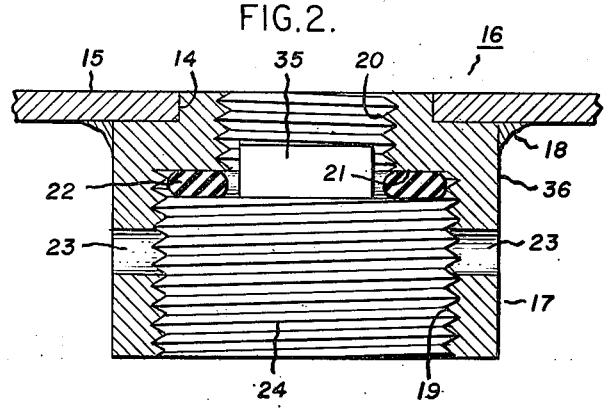
FIG. 2 is a cross-sectional and assembly view of one preferred form of the seal device of this invention.

Referring now to FIG. 2, the seal device 16 of the present invention is shown in assembled relationship. In FIG. 2, the aperture 14 of the cover 15 is adapted to receive a sleeve member 17 which is suitably joined to cover 15, for example, by brazing as noted at 18. Sleeve member 17 further defines a larger threaded lower aperture 19 and a smaller concentric and threaded upper aperture 20. The juncture of the two apertures 19 and 20 define an internal shoulder 21 in which there is positioned a suitable fluid sealing means such as O-ring seal 22. Spaced around the periphery of sleeve member 17 are a number of fill holes 23 which provide fluid flow communication from inside casing 11 through fill holes 23, into the sleeve member 17 and from there externally of the casing.

Suitably disposed within the aperture 19 is a threaded plug seal 24. Plug seal 24 is threaded to engage the threads of the aperture 19 and is adapted, therefore, to be threaded axially to the aperture 19 so that it covers the fill holes 23 and also engages O-ring 22 for compression sealing thereagainst.

The above described seal device 16 provides effective and long-term sealing means for an electrical capacitor casing. Rotation of the plug seal 24 axially into the sleeve member 17 permits the interior of an electrical capacitor to be placed in external flow communication through aperture 19 and 20 and fill holes 23. A backing off of the plug seal 24 causes the plug seal 24 to cover fill holes 23 while there is significant pressure within the container and just prior to engagement of the O-ring 22 by the plug 24.

Figure 3:
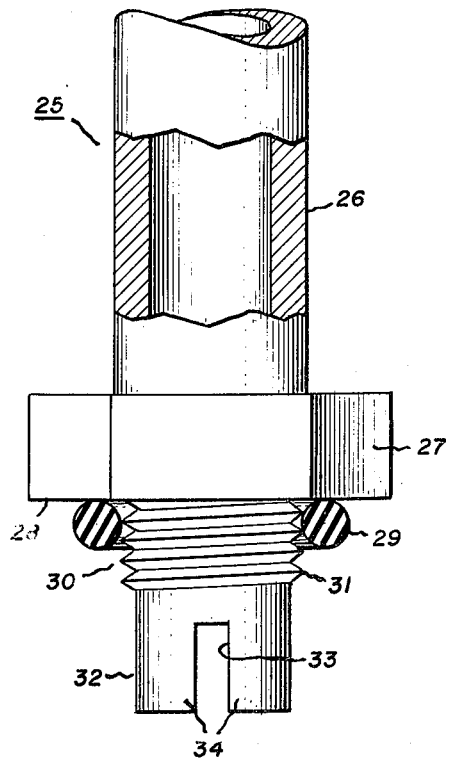
FIG. 3 is a cross-sectional view of the fill tube and seal device combination of this invention.

A most important part of this invention is the means by which a fill tube can be attached to the plug seal 24 and sleeve member 17 in such a manner that the capacitor casing may be filled under pressure, the plug seal 24 rotated to seal off fill holes 23, and the filling tube removed from sleeve member 17 without excessive fluid leakage. Such a means is more fully described with respect to FIG. 3. Referring now to FIG. 3, there is disclosed a fill tube assembly 25. This fill tube 25 comprises a central tube 26 incorporating a suitable wrench-attaching means such as a hex nut flange 27 adjacent one end thereof. Hex flange 27, in conjunction with the tube 26, form a shoulder 28 on which there is positioned a suitable further fluid sealing means such as an O-ring 29. A shank part 30 of tube 26 extends below the hex flange 27 and comprises a threaded part 31 and a wrench part 32. Wrench part 32 comprises a number of kerf-like openings 33 defining axially projecting splines 34. The described fill tube 25 is adapted to be inserted into the aperture 20 of sleeve member 17 of FIG. 2 so that the threads 31 on shank 30 engage the threads of the aperture 20 of sleeve member 17. The splines 34 are adapted to engage a suitable projecting rib or ridge 35 on plug seal 24 of FIG. 2.

Figure 4:
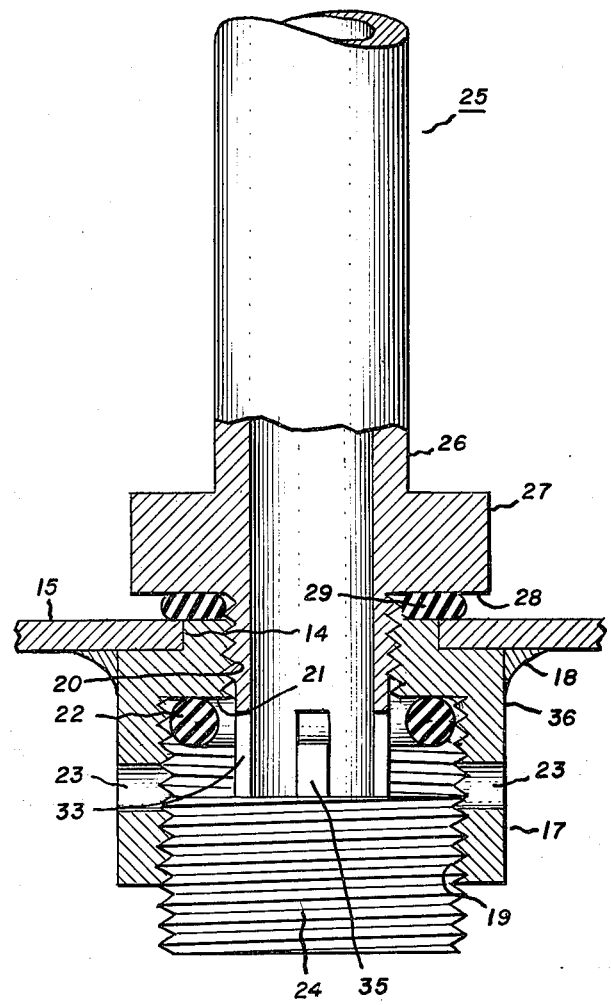
FIG. 4 is an illustration of the combined elements of FIGS. 2 and 3.

The operation of this device is best described with respect to FIG. 4 in combination with the individual elements as disclosed in FIGS. 2 and 3. Referring now to FIG. 4, there is shown the fill tube 25 in operative relationship with sleeve member 17 and plug seal 24. The threaded portion 31 of fill tube 25, and the length of the shank 30 extending therebeyond to define the splines 34 are of such a length that the splines 34 engage the rib 35 on plug seal 24 immediately upon insertion of the fill tube 25 into the aperture 20 and slightly before there is any engagement of threaded portion 31 of shank 30 with the threaded aperture 20. Consequently, the fill tube 25 may be rotated slightly to provide the correct alignment and engagement of its splines 34 with the rib 35 of plug seal 24. Upon engagement, the fill tube 25 is rotated such as by applying a suitable wrench means to the hex flange 27 to rotate plug seal 24 and move plug seal 24 axially downwardly in aperture 19. The threaded aperture 20 and the shank 30 of the fill tube are so proportioned that there is a significant engagement of their mating threads prior to the point where the plug seal 24 opens the fill holes 23. At the same time, the O-ring 29 is being compressed for sealing purposes. By these proportions, sealing is at a maximum and leakage is minimized in the very short transient period where the fill holes 23 are being opened by movement of the plug seal 24 and the hex flange 27 is compressing the O-rings 29.

When O-ring 29 is compressed in sealing relationship, the fill holes 23 are opened sufficiently to provide a flow communication through fill holes 23 into the aperture 19 and then through the kerf cuts 33 in fill tube 25 and through the center of the tube 26. A suitable conduit is attached to the upper end of tube 26 so that fluid under pressure can flow through fill tube 25 and into the capacitor casing 11 of FIG. 1. When the capacitor casing 11 has been filled to its maximum and is under a pressure of about from 10–15 pounds per square inch, inward flow of the impregnant is ceased. Thereafter by suitable rotation of the fill tube 25, for example, by a wrench means attached to the hex flange 27, the plug seal 24 is rotated in a counterclockwise direction or upwardly into aperture 19 to close off the fill holes 23.

The proportionality referred to between the length of shank 30 and the length of sleeve member 17, and between the lengths of the threaded portion 31 and the threaded aperture 20 provides that the fill holes 23 are significantly closed off before there is any relaxation of the O-ring seal 29 to the extent that considerable leakage would be experienced. At the same time, since there is a significant number of threads 31 in engagement with the threads of aperture 20, any leakage during the closing off period is minimal. Further rotation of the fill tube 25 provides an engagement of the plug seal 24 in sleeve member 17. Because of the proportionality referred to, O-ring 22 is its maximum sealing position after there is a disengagement of threads 31 from the threads of aperture 20.

The described process indicates that the fill tube 25 can be inserted within sleeve member 17 and freely rotated to provide a proper engagement of rib 35 and splines 34 before there is any undue limitation by reason of engaging threads. It follows, therefore, that the plug seal 24 may be properly sealed against O-rings 21 after the threaded part 31 has been disengaged from threaded aperture 20, so that there is no limitation upon the removal of the fill tube 25 from sleeve member 17 at the completion of the filling operation. It may be desirable in some instances to have the threads of apertures 19 and 20 of a slightly different pitch to thereby shorten the transient period between compression of an O-ring and closing of the fill holes 23.

The sleeve member 17 of this invention is expeditiously formed with an external shoulder 36 to facilitate welding or brazing to a casing 11. However, sleeve member 17 may be suitably threaded into a correspondingly threaded opening in a casing, and in either case may project slightly above the opening.

In the final condition of the capacitor, aperture 20 may be suitably filled with a filler or sealing material such as solder, for example, to provide a finished appearance and to protect the threads of aperture 20 as well as the entire seal device 16. Should there by any occasion to reopen the capacitor for a refilling operation perhaps caused by repair work on the capacitor, the filler material is removed from aperture 20, the fill tube is inserted as described, and refilling may proceed. With prior pinch off seals for capacitors, such a reopening required a cutting away of weld material or a steel tube, either operation having the inherent danger of spilling metal particles into the capacitor with disastrous results in later operation. At the same time, prior seals required welding for resealing or elaborate tube pinching operation for resealing. The present invention provides reopening and resealing with a simple tool without cutting or welding.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A capacitor casing fill tube and seal means comprising in combination
   a. a sleeve member adapted to be positioned in one wall of a capacitor casing and projecting inside of said casing,
   b. an internal shoulder means in said sleeve member and defining a pair of coaxial and threaded smaller diameter upper and larger diameter lower apertures,
   c. a threaded plug seal in said lower aperture,
   d. said sleeve member having a lateral aperture in the wall thereof which is coverable and uncoverable by rotation of a plug seal in said sleeve member,
   e. fill tube wrench engagement means on said plug seal and adapting said plug seal to abut said internal shoulder,
   f. and fluid sealing means between said plug seal and said internal shoulder and adapted to be compressed in fluid tight relationship when said plug seal is rotated to move axially in a direction towards the outside of said casing subsequent to covering said coverable and uncoverable opening,
   g. and a fill tube wrench means adapted to engage said fill tube wrench engagement means on said plug and rotate said plug seal to pass fluid through said opening into said casing.

2. A capacitor casing fill tube and seal means comprising in combination
   a. a sleeve member adapted to be positioned in one wall of a capacitor casing and projecting inside of said casing,
   b. an internal shoulder means in said sleeve member defining a pair of coaxial and threaded upper and lower apertures,
   c. said sleeve member having a transverse opening therethrough which opens from the interior of said casing into said lower aperture,
   d. a threaded plug seal in said lower aperture and adapted to cover and uncover said transverse opening,
   e. fill tube wrench engagement means on said plug seal and adapting said plug seal to abut said internal shoulder,
   f. and fluid sealing means between said plug seal and shoulder and adapted to be compressed in fluid tight relationship when said plug seal is rotated to move axially in a direction towards the outside of said casing subsequent to covering said transverse opening,
   g. and a fill tube wrench means adapted to engage said fill tube wrench engaging means on said plug and rotate said plug seal to pass fluid through said transverse opening.

3. The invention as recited in claim 2 wherein said internal shoulder means defines an upper smaller diameter threaded aperture and a lower larger diameter threaded aperture, and said fluid sealing means is a ring seal positioned on said shoulder means.

4. The invention as recited in claim 2 wherein said sleeve is flush mounted in a capacitor casing.

5. The invention as recited in claim 2 wherein the pitch of the thread of said upper aperture is different than the pitch of the thread of said lower aperture.

6. A capacitor casing fill tube and seal means comprising in combination
   a. a sleeve member adapted to be positioned in one wall of a capacitor casing and projecting inside of said casing,
   b. an internal shoulder means in said sleeve member defining a pair of coaxial and threaded larger diameter lower and smaller diameter upper apertures,
   c. said sleeve member having a transverse opening therethrough which opens from the interior of said casing into said lower aperture,
   d. a threaded plug seal in said lower aperture and adapted to cover and uncover said transverse opening,
   e. fill tube wrench engagement means on said plug seal and adapting said plug seal to abut said internal shoulder,
   f. fluid sealing means between said plug seal and said internal shoulder and adapted to be compressed in fluid tight relationship when said plug seal is rotated to move axially in a direction towards the outside of said casing subsequent to covering said transverse opening,
   g. and a fill tube wrench means therefore comprising
      1. a fill tube having one end adapted as a filling end and the other as a wrench end, and fluid flow communication therethrough,
      2. shoulder means on said fill tube facing the said wrench end,
      3. a fixed further fluid sealing means on said shoulder means and facing said wrench end,
      4. a threaded shank part of said fill tube adajacent said further fluid sealing means and extending toward said wrench end and adapted to threadedly engage said upper threaded aperture of said sleeve member,
      5. and wrench means at the end of said fill tube engaging said fill tube wrench engaging means on said plug seal,
      6. said wrench means having openings in said shank part adapted to provide fluid flow communication through said tube and said transverse opening while said wrench is in engagement with said plug seal, and said transverse opening is uncovered by said plug seal.

7. The invention as recited in claim 6 wherein said wrench means comprises circumferentially spaced axially extending portions on said shank part adapted to mechanically interfit with said wrench engagement means on said plug seal, said extending portions being defined and spaced to provide fluid flow communication through said tube while said wrench means is in engagement with said plug seal, and said transverse opening is uncovered by said plug seal.

* * * * *